UNITED STATES PATENT OFFICE.

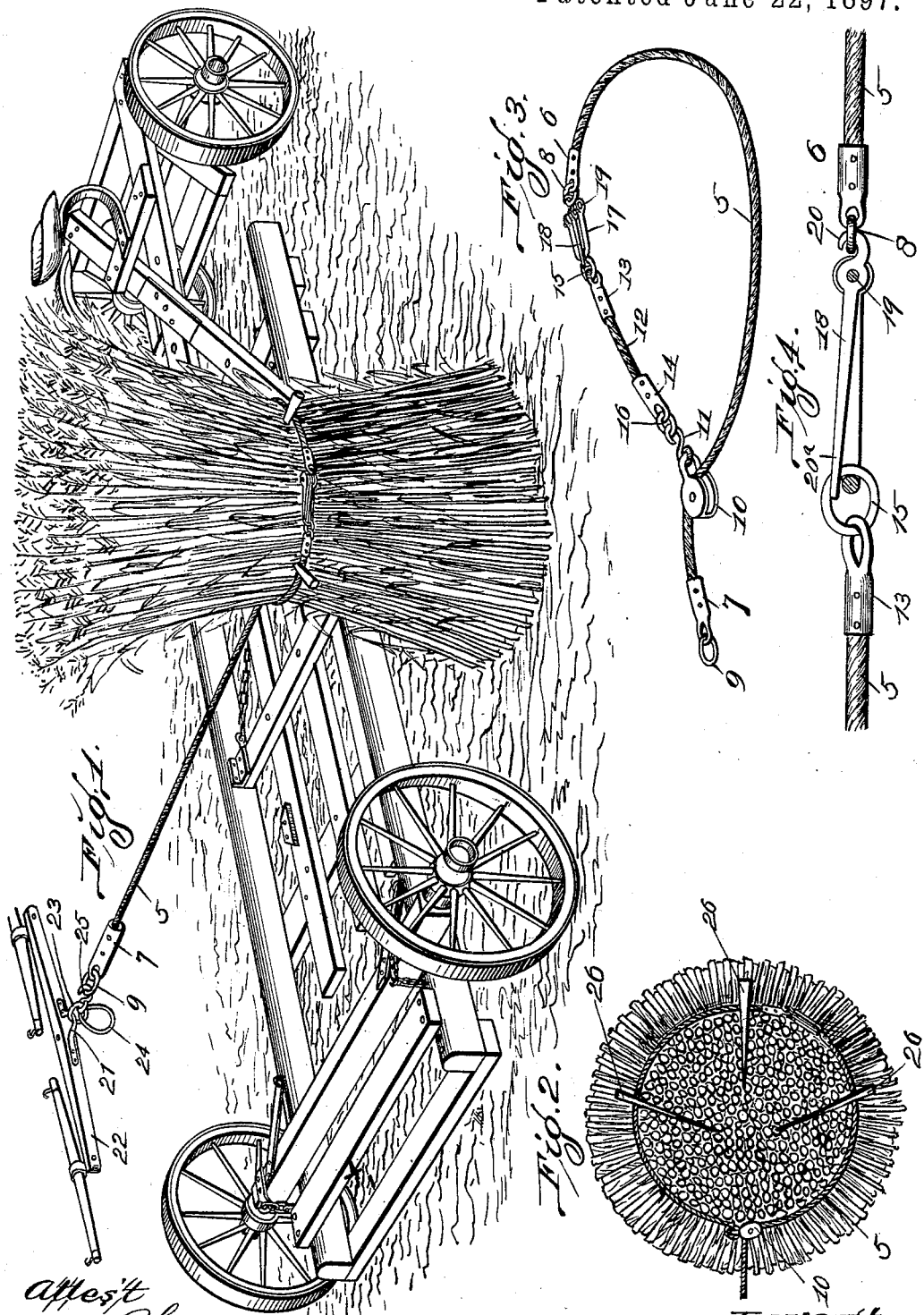

THEODORE MEYER, OF SCHLUERSBURG, MISSOURI.

FODDER-LOADER.

SPECIFICATION forming part of Letters Patent No. 585,002, dated June 22, 1897.

Application filed January 4, 1897. Serial No. 617,977. (No model.)

*To all whom it may concern:*

Be it known that I, THEODORE MEYER, of the city of Schluersburg, St. Charles county, State of Missouri, have invented certain new and useful Improvements in Fodder-Loaders, of which the following is a full, clear, and exact description, reference being had to the accompanying drawings, forming a part hereof.

My invention relates to fodder-loaders; and it consists in the novel construction, combination, and arrangement of parts hereinafter shown, described, and claimed.

Figure 1 is a view in perspective, illustrating the use of my improved fodder-loader. Fig. 2 is a horizontal sectional view through a shock of fodder or corn and illustrating the use of my improved fodder-loader. Fig. 3 is a view in perspective of the fodder-loader. Fig. 4 is a detail sectional view illustrating the construction of the fodder-loader shown in Fig. 3.

In carrying out the principles of my invention I use a low-down fodder-rack, and the purpose of my invention is to place shocks of corn or fodder upon the rack.

My fodder-loader consists of the rope or cable 5, having the metallic eye 6 attached to one of its ends and the metallic eye 7 attached to its opposite end. A ring 8 operates in the eye 6, and a similar ring 9 operates in the eye 7. The rope 5 operates through the block and pulley 10, and a hook 11 depends from said block and pulley. A short piece of rope 12 has the eye 13 upon one end and the eye 14 upon its opposite end. A ring 15 operates in the eye 13, and a similar ring 16 operates in the eye 14. The eye 16 engages the hook 11. The clevis 17 is passed through the ring 15, and a lever 18 is pivotally connected to the clevis 17 by means of the clevis-pin 19. The long end $20^a$ of the lever is somewhat longer than the clevis 17 and is designed to be used as a handle in releasing the fodder after it has been loaded. The hook 20 is formed upon the lever 18 opposite the clevis-pin from the handle $20^a$ and said hook engages the ring 8.

The loop 21 is attached to the rear side of the doubletree 22 and at its center, as shown in Fig. 1. Before attaching the loop 21 to the doubletree said loop is passed through the ring 23, and the ring 24 is linked to said ring 23. The doubletree 25 has one of its ends passed through the ring 23 and said end is cold-shut, thus forming a link connection between the hook 25 and the doubletree. The hook 25 engages the ring 9. The ring 24 is used as a handle for carrying the doubletree in hitching and unhitching from the fodder-loader. The cables 5 and 12 may be either rope, wire cable, or chain.

In the practical operation of my improved fodder-loader the low-down fodder-rack is drawn up beside the shock of corn or fodder, as shown in Fig. 1, and the hook 20 is disengaged from the ring 8 and the clevis 17 is passed around the shock in one direction and the ring 8 is passed around the shock in the other direction, and then said hook 20 is again placed in the ring 8. In order to keep the cables 5 and 12 from slipping upwardly on the shock, I insert stakes 26 into the shock of corn or fodder in a horizontal plane and at points around said shocks and above the cables, as shown in Fig. 2. The team is then attached to the doubletree 22 and is driven away from the fodder-rack until the shock is drawn over and upon the fodder-rack. After the shock has been drawn upon the rack and into the desired position the handle $20^a$ is operated and elevated to disengage the hook 20 from the ring 8, thus releasing the fodder and allowing the cables to be drawn from the shock and leaving the corn upon the rack, from whence it may be unloaded by hand or in any suitable manner.

When it is desired to unload by a team, the ring 8 is passed around the shock and placed in engagement with the hook 11, the stakes 26 are inserted into the shock of corn or fodder, the team is attached to the doubletree 22, the ring 9 is placed in engagement with the hook 25, and the team is driven away from the fodder-rack until the shock is drawn over and upon the fodder-rack, as before. After the shock has been drawn upon the fodder-rack and into the desired position the ring 9 is disconnected from the hook 25 and the free end of the rope 5 is carried back over the shock to the opposite side of the rack. Then another loading device identical with that last described is placed around a second shock, and said shock is brought upon the rack beside the first one and the rope 5 of said second shock is passed backwardly over the shock to the opposite side of the rack. Then the corn is hauled to the desired place for unloading, the team is driven to the side of the rack toward which the butts of the corn point, and the rings 9 on both of the cables are engaged in the hook 25 and the team is driven away from the rack, thus unloading the corn upon the same side of the rack from which it was loaded and with the stalks standing upon their butt-ends. In this way two or more large shocks of corn or fodder may be loaded upon the rack one at a time, and after being hauled to the desired location all of the shocks may be unloaded at once.

I claim—

1. A fodder-loader, consisting of a block and pulley, a hook attached to said block, a ring removably engaging said hook, a cable attached to said ring and passing around the shock of fodder, through said block and over said pulley and stakes driven into the shock above said cable, substantially as specified.

2. A fodder-loader, consisting of a block and pulley, a cable attached to said block, a clevis attached to said cable, a lever pivotally mounted upon the clevis-pin, a hook upon said lever, a ring removably engaging said hook, a cable attached to said ring and passing around the shock of fodder, through said block and over said pulley, and stakes driven into the shock above said cable, substantially as specified.

In testimony whereof I affix my signature in presence of two witnesses.

THEODORE MEYER.

Witnesses:
MAUD GRIFFIN,
S. G. WELLS.